US012385454B2

(12) United States Patent
Aoki et al.

(10) Patent No.: US 12,385,454 B2
(45) Date of Patent: Aug. 12, 2025

(54) SUPPORT STRUCTURE FOR INTAKE MANIFOLD

(71) Applicant: KUBOTA Corporation, Osaka (JP)

(72) Inventors: Kosuke Aoki, Sakai (JP); Hiroyuki Kawasoe, Sakai (JP); Kengo Hidaka, Sakai (JP); Kohta Nakao, Sakai (JP); Miharu Yahata, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/679,397

(22) Filed: May 30, 2024

(65) Prior Publication Data

US 2025/0003377 A1 Jan. 2, 2025

(30) Foreign Application Priority Data

Jun. 29, 2023 (JP) ................................. 2023-107316

(51) Int. Cl.
*F02M 35/104* (2006.01)
*F02M 35/10* (2006.01)

(52) U.S. Cl.
CPC .... *F02M 35/104* (2013.01); *F02M 35/10078* (2013.01)

(58) Field of Classification Search
CPC ....................... F02M 35/104; F02M 35/10078
USPC .................................................... 123/184.21
See application file for complete search history.

(56) References Cited

U.S. PATENT DOCUMENTS 5,769,045 A * 6/1998 Edwards ............. F02M 35/161 123/184.61

FOREIGN PATENT DOCUMENTS

JP 2021110297 A 8/2021

* cited by examiner

*Primary Examiner* — Lindsay M Low
*Assistant Examiner* — Omar Morales
(74) *Attorney, Agent, or Firm* — Panitch Schwarze Belisario & Nadel LLP

(57) ABSTRACT

A support structure for an intake manifold that reduces a burden of support on a front side of the intake manifold. The support structure includes a cylinder head and a fixing structure, and supports the intake manifold. An axial length direction of a crankshaft center is defined as a left-right direction, a horizontal direction orthogonal to the left-right direction is defined as a front-rear direction, and one side in the front-rear direction is defined as a front side. The intake manifold includes a collector and a plurality of branch pipes led out to the front side from the collector. An intake outlet at a front end of each of the branch pipes is supported by the cylinder head. The collector is elastically supported by the fixing structure. A throttle body is attached to a left or right end of the collector.

12 Claims, 13 Drawing Sheets

SUPPORT STRUCTURE FOR INTAKE MANIFOLD

CROSS-REFERENCE TO RELATED APPLICATIONS

This application claims priority under 35 U.S.C. § 119(b) to Japanese Application No. 2023-107316, filed Jun. 29, 2023, the disclosure of which is incorporated herein by reference in its entirety.

BACKGROUND OF THE INVENTION

(1) Field of the Invention

The present invention relates to a support structure for an intake manifold.

(2) Description of Related Art

In a conventional engine, since the intake manifold is supported in a cantilever manner on a cylinder head side, a load of support on the front side of the intake manifold increases due to a rotational moment caused by vertical movement of a collector.

In particular, since a throttle body having a relatively large weight is attached to the collector, a burden of support on a front side of the intake manifold increases due to a rotational moment caused by vertical movement of the throttle body.

SUMMARY OF THE INVENTION

An object of the present invention is to provide a support structure for an intake manifold, the support structure reducing a burden of support on a front side of the intake manifold.

The main configuration of the present invention is as follows.

A support structure for an intake manifold includes a cylinder head and a fixing structure and supports an intake manifold, in which

- an axial length direction of a crankshaft center is defined as a left-right direction, a horizontal direction orthogonal to the left-right direction is defined as a front-rear direction, one side in the front-rear direction is defined as a front side,
- the intake manifold includes a collector including a synthetic resin, the intake manifold including a plurality of branch pipes led out to the front side from the collector, an intake outlet at a front end of each of the branch pipes is supported by the cylinder head, the collector is elastically supported by the fixing structure via a pair of coupling plates having an identical isosceles triangle shape, and
- a throttle body is attached to a left or right end of the collector, the left or right end being opposite to a side supported by the fixing structure.

Effects

The present invention has the following effects.

The collector is elastically supported by the fixing structure via the pair of coupling plates, and the intake manifold is supported at the both front and rear sides. Therefore, a burden of supporting the front side of the intake manifold is reduced.

Since the collector separated rearward from the cylinder head includes lightweight synthetic resin, a rotational moment caused by vertical movement of the collector is reduced, and in this respect, the burden of supporting the front side of the intake manifold is also reduced.

Since the collector is elastically supported by the fixing structure, the vertical vibration between the collector and the throttle body having a relatively large weight is reduced, and the burden of supporting the front side of the intake manifold is reduced.

BRIEF DESCRIPTION OF THE DRAWINGS

FIG. 2A is a side view, and FIG. 2B is a rear view;

FIG. 7A is a sectional view of a main part, and FIG. 7B is an exploded perspective view of the main part;

FIG. 8A is a rear view of a main part, and FIG. 8B is a perspective view of the main part;

DETAILED DESCRIPTION OF PREFERRED EMBODIMENTS

FIGS. 1 to 13 are diagrams for describing a multipurpose four-wheeled vehicle according to an embodiment of the present invention and an engine and a transmission mounted on the multipurpose four-wheeled vehicle. In this embodiment, a multipurpose four-wheeled vehicle equipped with an inclined four-cycle in-line two-cylinder diesel engine and a continuously variable transmission (CVT) will be described.

Figure 1:
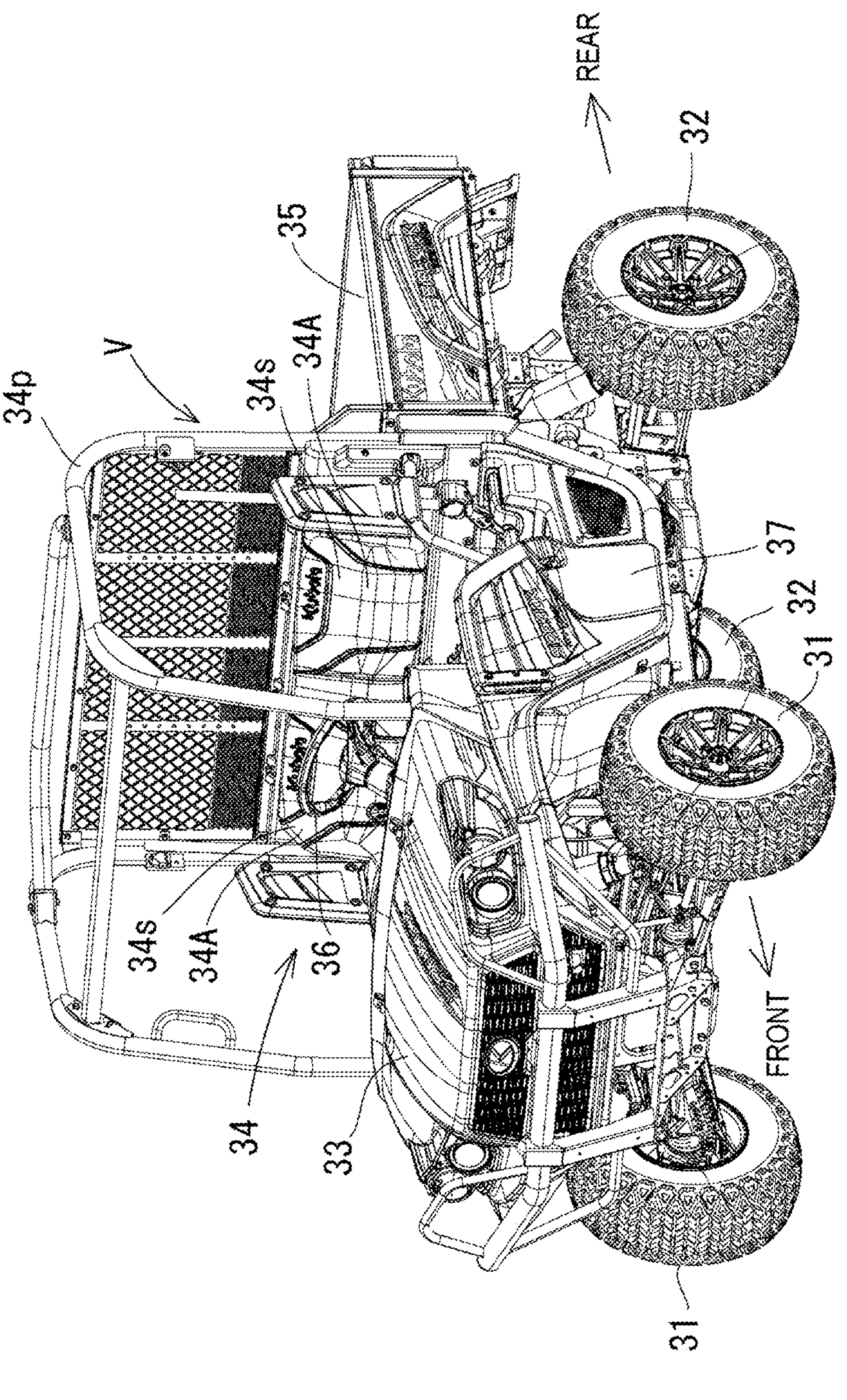
FIG. 1 is a perspective view of a multipurpose four-wheeled vehicle according to an embodiment of the present invention as viewed from front and above.
Figure 2A:
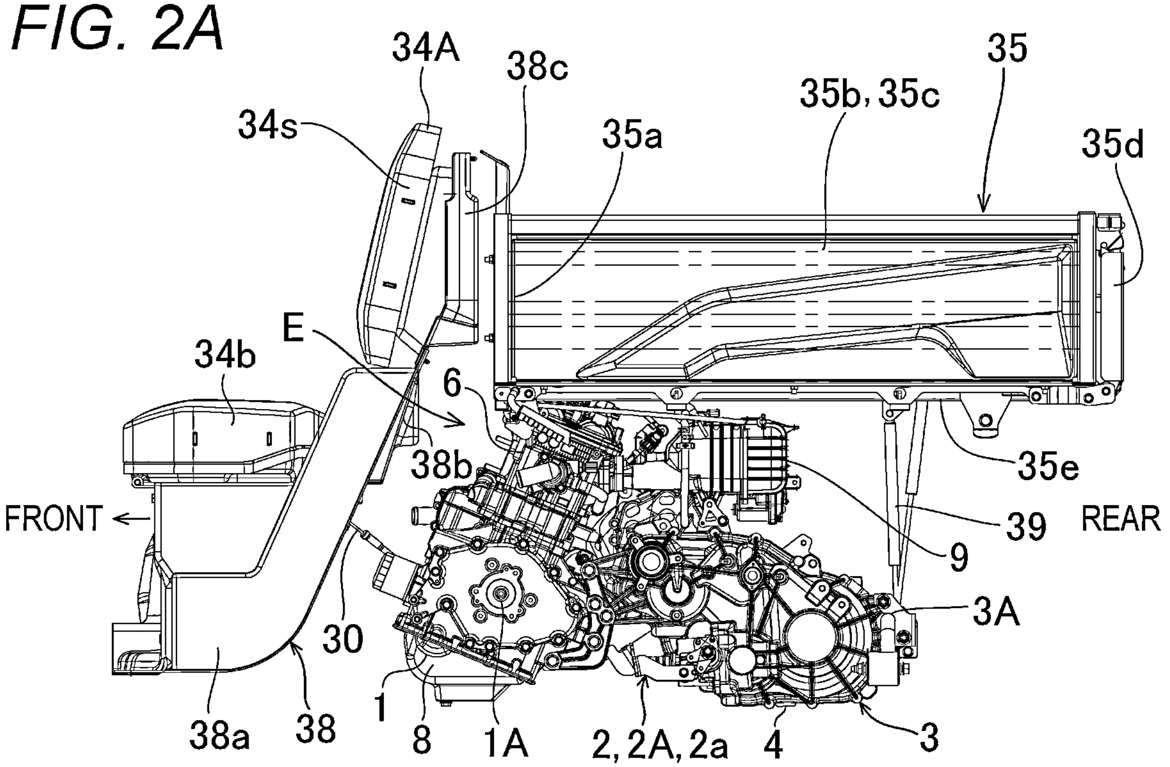
FIGS. 2A and 2B are explanatory diagrams of an engine mounted on the multipurpose four-wheeled vehicle in FIG. 1 and a periphery of the engine.
Figure 2B:
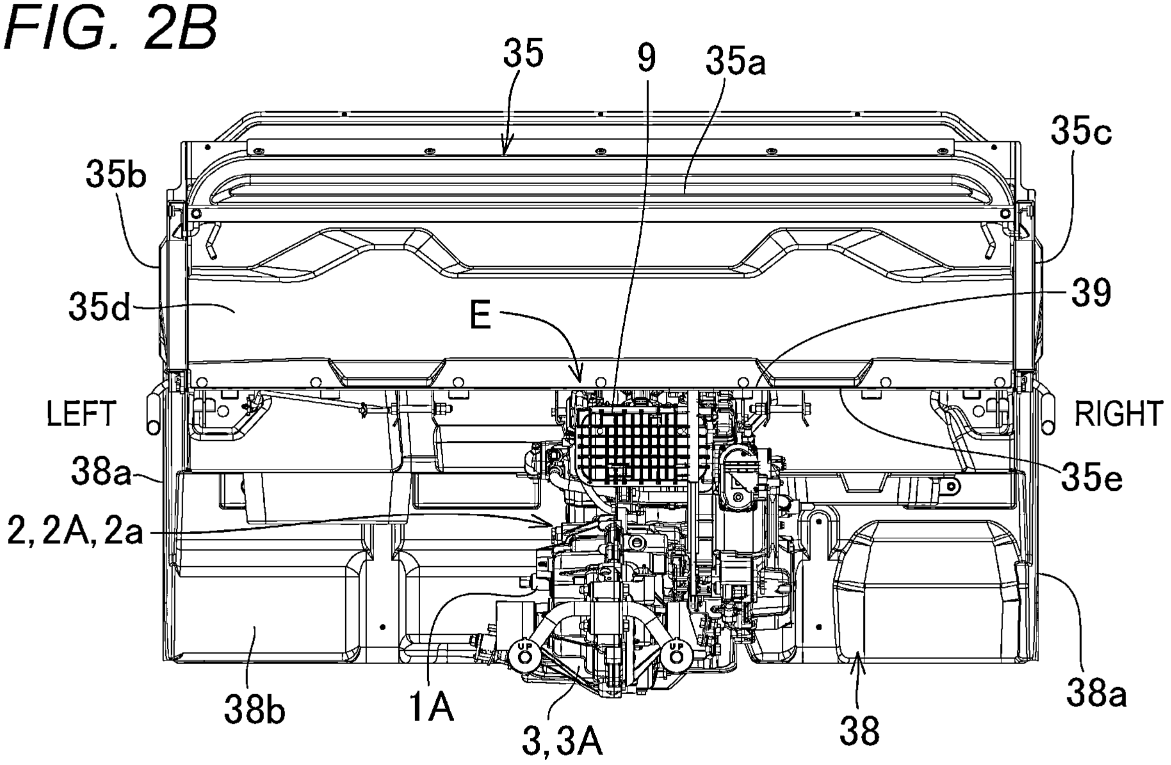

FIG. 1 illustrates a multipurpose four-wheeled vehicle V for off-road use, and as illustrated in FIG. 2A and FIG. 2B, an engine E is disposed in a lateral position with a crankshaft 1A facing sideways.

Figure 3:
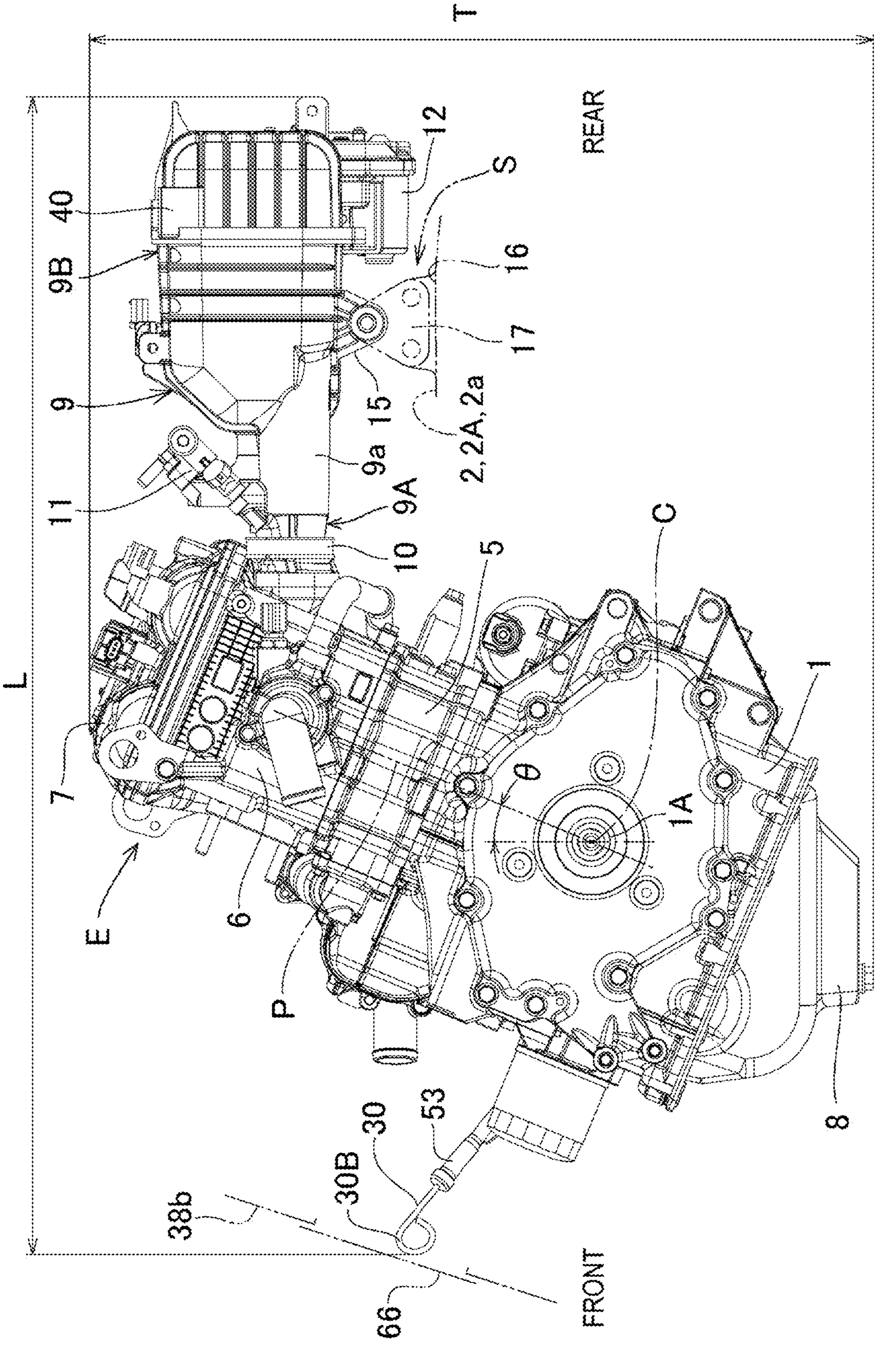
FIG. 3 is a side view of the engine in FIG. 2A and FIG. 2B.
Figure 4:
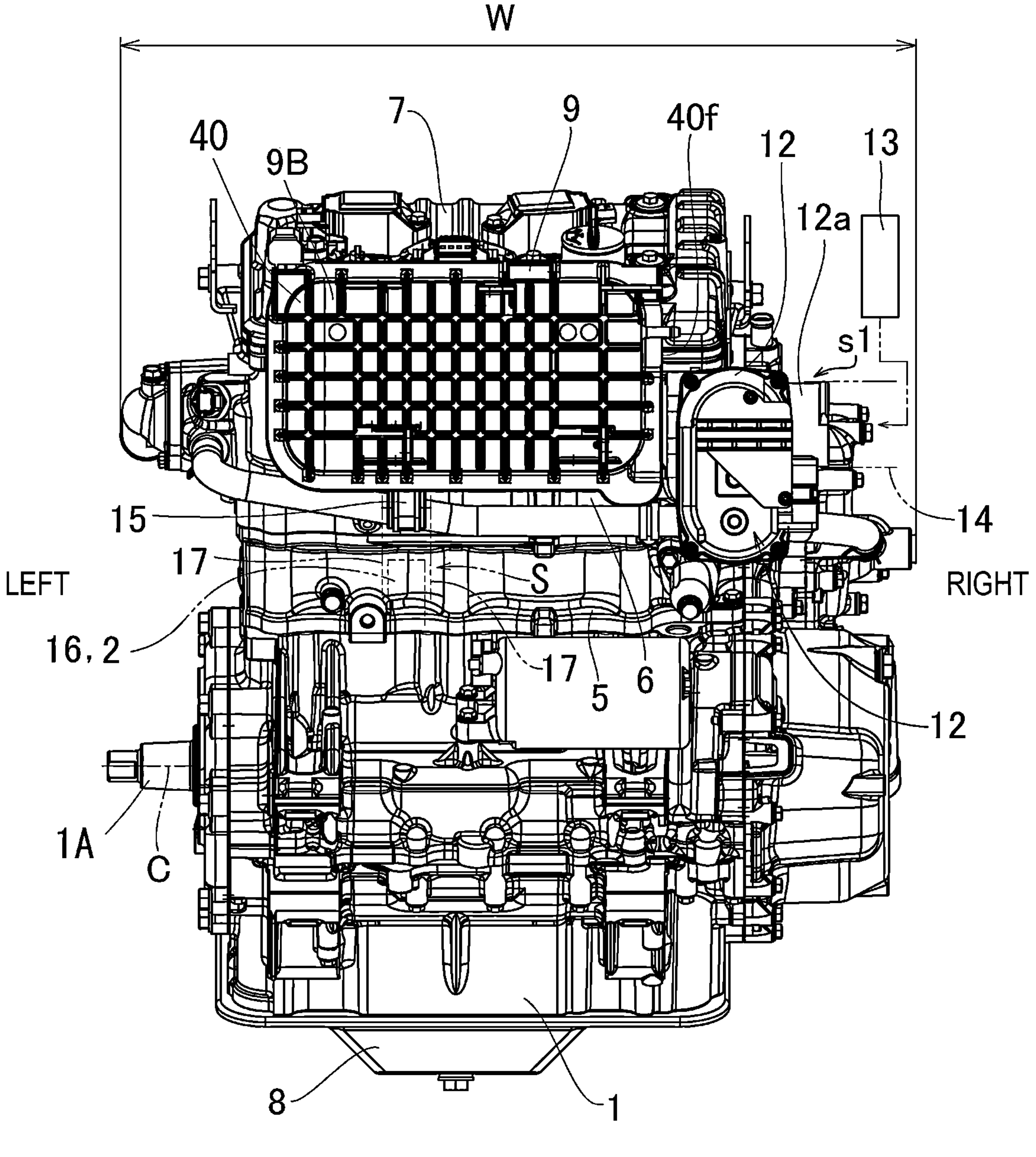
FIG. 4 is a rear view of the engine in FIG. 2A and FIG. 2B.

In this embodiment, as illustrated in FIG. 4, an axial length direction of a crankshaft center C is described as a left-right direction, as illustrated in FIG. 3, a horizontal direction orthogonal to the left-right direction is described as a front-rear direction, a vehicle forward side in the front-rear direction is described as a front side, and the opposite side of the front side is described as a rear side.

As illustrated in FIG. 1, the multipurpose four-wheeled vehicle V includes a pair of left and right front wheels 31 and 31, a pair of left and right rear wheels 32 and 32, a front hood 33, a boarding section 34, and a rear cargo bed 35 in the rear side. A pair of left and right seats (boarding seats) 34A and 34A is disposed in the boarding section 34 surrounded by a pipe material 34*p*. In FIG. 1, a reference sign 34*s* denotes a backrest of the seat 34A, a reference sign 36 denotes a steering wheel, and a reference sign 37 denotes an opening and closing door.

FIGS. 2A and 2B illustrate the engine E mounted on the multipurpose four-wheeled vehicle V and a periphery of the engine E. As illustrated in FIG. 2A, the engine E and the transmission 2A are disposed behind the seat 34A and below a front portion of the cargo bed 35. The seat 34A is configured such that a seat bottom 34*b* and the backrest 34*s* are supported by a support frame 38 in a rearward tilting oblique orientation, and the engine E is provided immediately behind the support frame 38 and at a position in a center slightly rightward in the left-right direction as illustrated in FIG. 2B.

As illustrated in FIG. 2A, the engine E is mounted on a body frame (not illustrated) in an orientation in which a piston (not illustrated) moving direction slightly falls rearward, and the transmission 2A is disposed behind the crankcase 1 of the engine E. The transmission 2A is a continuously variable transmission (CVT), and a differential device 3 is provided on the rear side of the transmission 2A. A rear axle 4 extends from the differential device 3 to the left and right, and as illustrated in FIG. 2A, a support connecting member 39 that connects a bottom plate 35*e* of the cargo bed 35 and a differential case 3A is installed.

As illustrated in FIG. 2B, the support frame 38 that supports the seat 34A includes left and right side plates 38*a* and 38*a* and a back plate 38*b* between the side plates 38*a* and 38*a*, and as illustrated in FIG. 2A, an upper portion of the back plate 38*b* is a vertical frame 38*c* that supports the backrest 34*s*.

As illustrated in FIG. 2A, the cargo bed 35 includes a front plate 35*a*, left and right side plates 35*b* and 35*c*, a rear plate (tailgate) 35*d*, and the bottom plate 35*e*, and is provided immediately above the engine E disposed in the rear part of a vehicle body.

As illustrated in FIG. 2A, this engine is a lateral inclined engine, and as illustrated in FIG. 3, when viewed in a direction parallel to the crankshaft center C, the engine is mounted with a piston movement axis P inclined rearward at an angle θ with respect to a perpendicular line, and includes a crankcase 1, a cylinder 5, a cylinder head 6, and a head cover 7. A total length (engine front-rear length dimension) L and a total height (engine height) T of the engine E illustrated in FIG. 3 and a total width (engine width) W illustrated in FIG. 4 are made compact as compared with a conventional engine.

As illustrated in FIG. 2A, an oil pan 8 is assembled under the crankcase 1, and an intake manifold 9 is assembled on the rear side (intake side) of the cylinder head 6. The output of the engine E is shifted by the transmission 2A disposed behind the crankcase 1, and then transmitted to the left and right rear axles 4 and 4 and the rear wheels 32 and 32 (see FIG. 1) via the differential device 3. On the front side of the crankcase 1, an oil inspector including an oil gauge 30 is provided in an orientation facing forward and obliquely upward.

Figure 9:
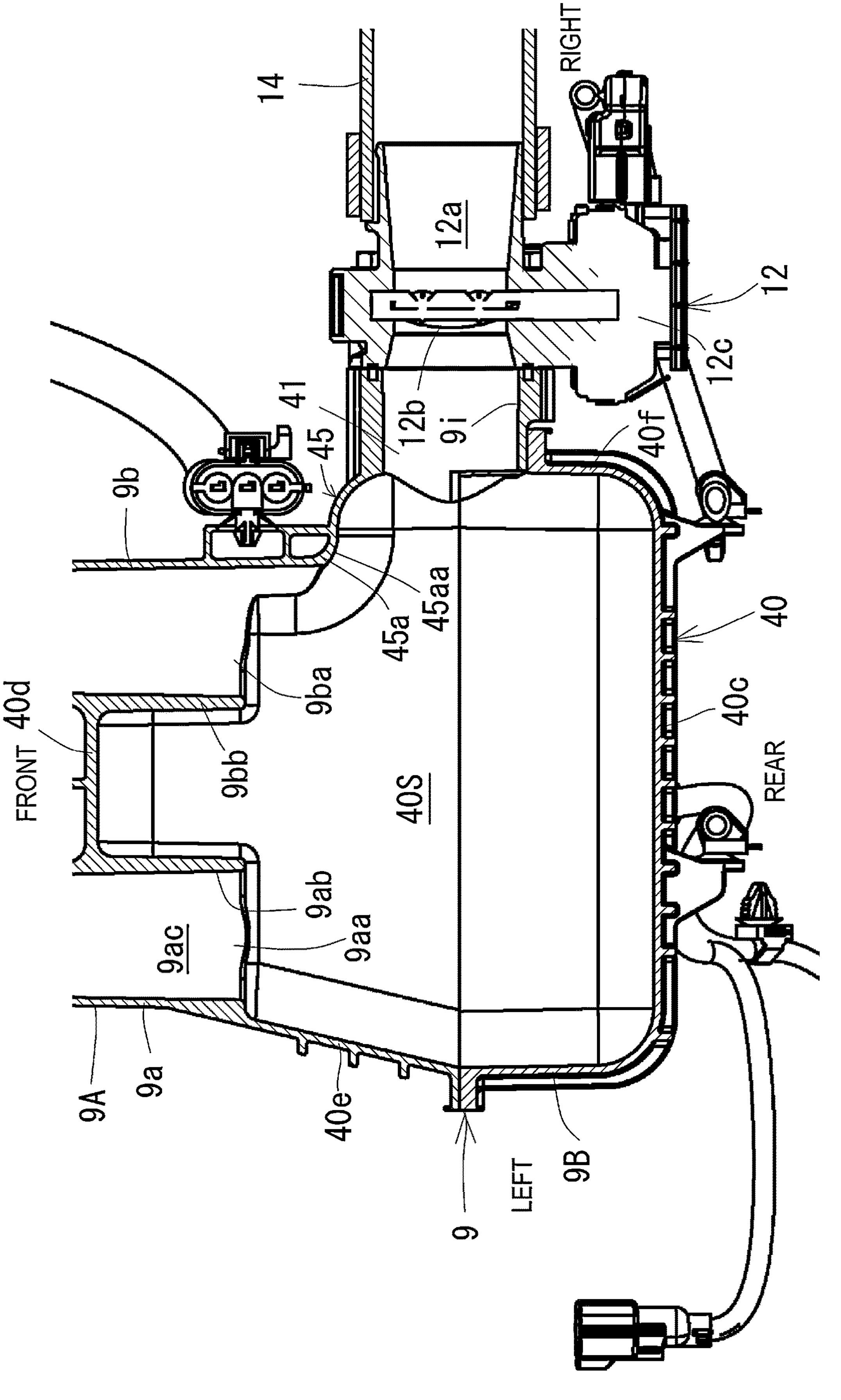
FIG. 9 is a sectional plan view of the intake manifold used in the engine mounted on the multipurpose four-wheeled vehicle in FIG. 1.

The intake manifold 9 illustrated in FIG. 9 includes synthetic resin, and including a manifold front portion 9A provided with a pair of branch pipes 9*a* and 9*b* and a manifold rear portion 9B following the manifold front portion 9A.

Figure 5:
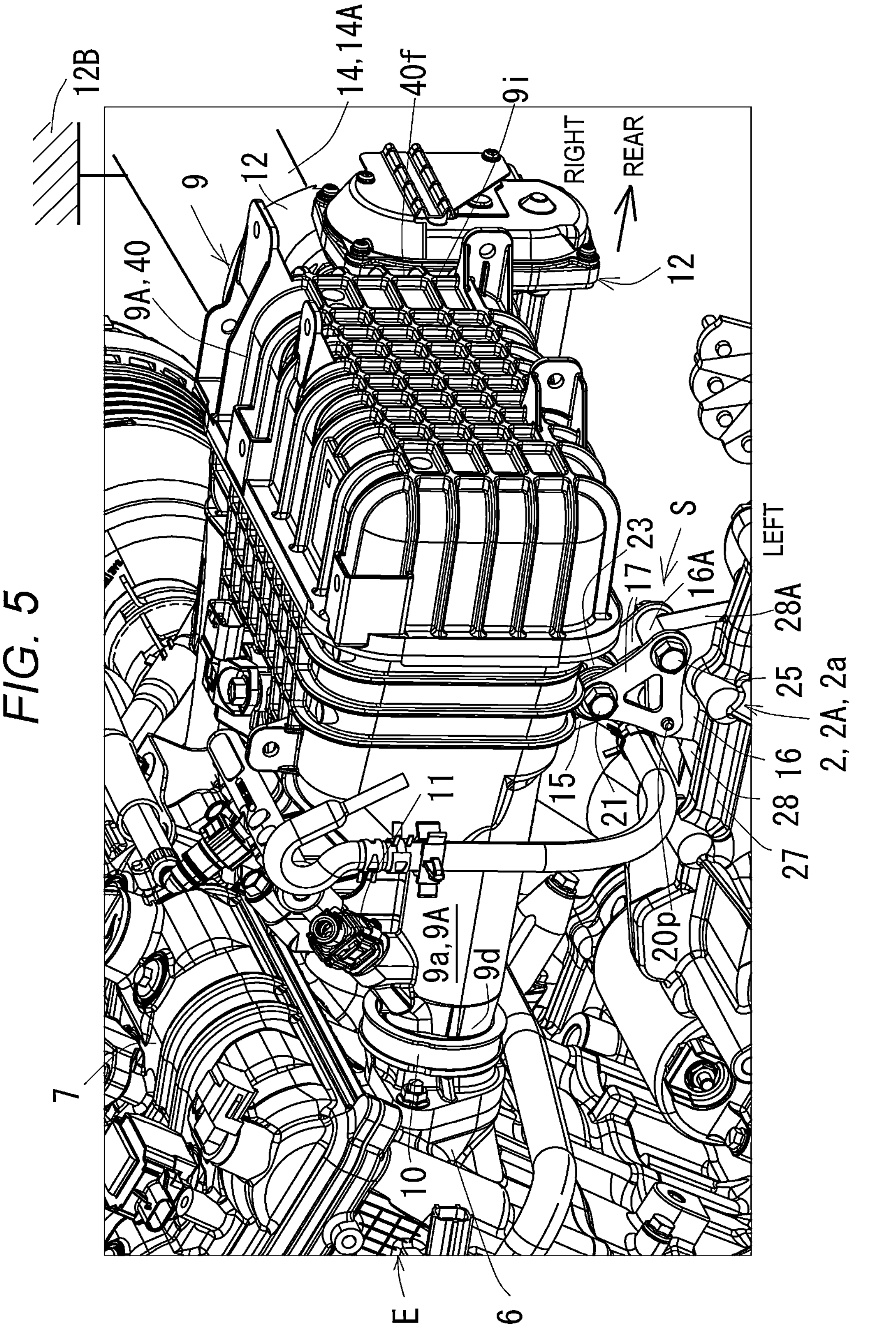
FIG. 5 is a perspective view of an intake manifold and a periphery of the intake manifold.
Figure 6:
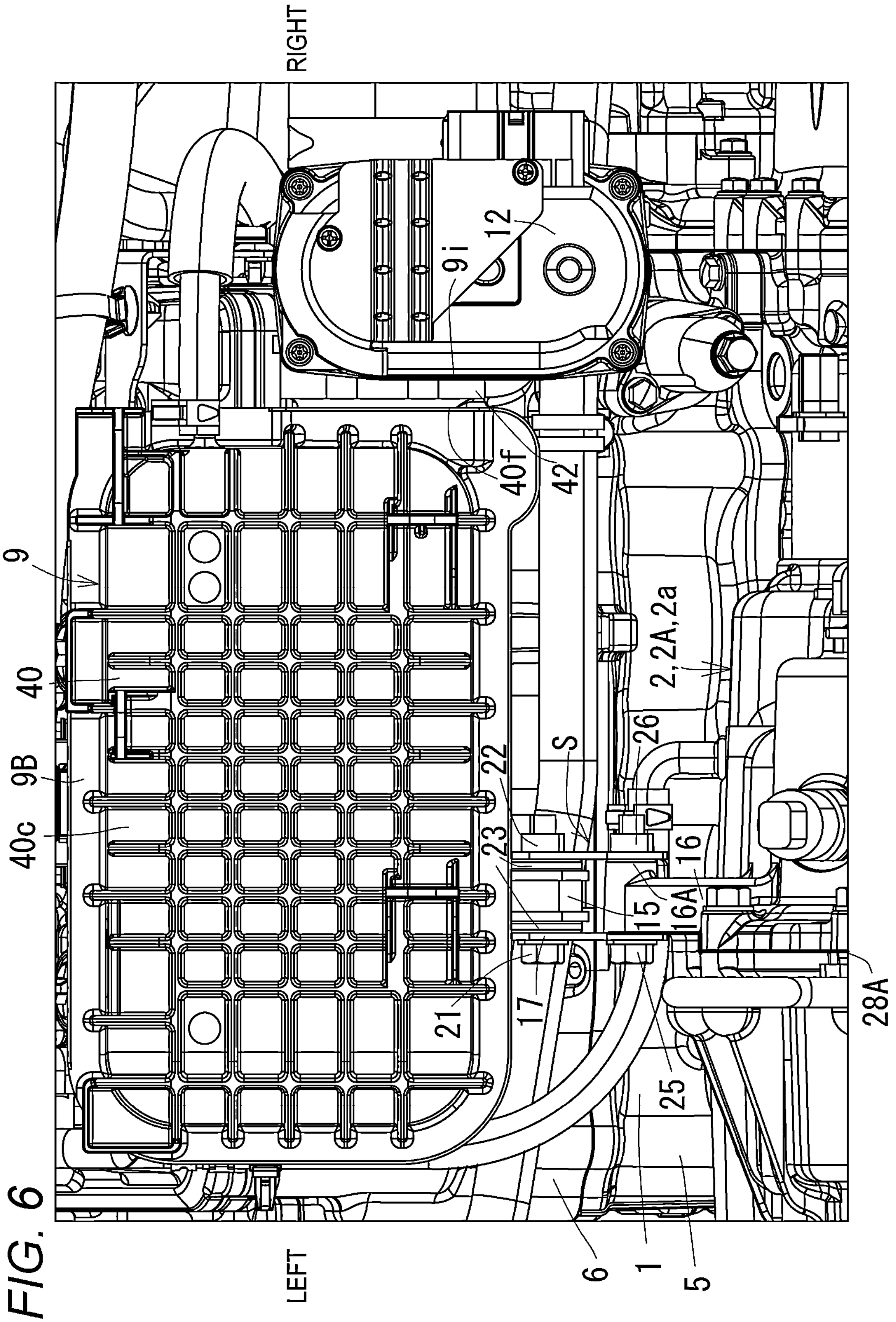
FIG. 6 is a rear view of FIG. 5.

As illustrated in FIG. 5, a front end of the manifold front portion 9A is elastically supported by the cylinder head 6 via an elastic insulator 10, and a supported portion 15 provided at a lower portion of the manifold rear portion 9B is supported by a housing 2*a* of the transmission 2A.

As illustrated in FIG. 5, a fuel injector 11 is provided in an upper portion of each of the branch pipes 9*a* and 9*b* (see FIG. 9 for the branch pipe 9*b*) in an orientation facing forward and downward, and a throttle body 12 is attached to a right side wall 40*f* of the manifold rear portion 9B. The intake manifold 9 includes an intake inlet 9*i* that opens sideways on the right side of the rear portion of the intake manifold 9, and two intake outlets 9*d* at the front end (front end of each of the branch pipes 9*a* and 9*b*).

As illustrated in FIG. 9, the throttle body 12 includes a venturi 12*a*, a throttle valve 12*b*, and a valve actuator 12*c*.

A support structure for the intake manifold 9, an internal structure and an outer wall structure of a collector 40 of the intake manifold 9, an engine model using the intake manifold 9, and the oil inspector of the engine, which are main elements of the engine, will be described.

The support structure for the intake manifold 9 is as follows.

As illustrated in FIG. 5, the support structure for the intake manifold 9 includes the cylinder head 6 and a fixing structure 2, and supports the intake manifold 9.

As described above, the axial length direction of the crankshaft center C illustrated in FIG. 4 is defined as the left-right direction, as illustrated in FIG. 3, the horizontal direction orthogonal to the left-right direction is defined as the front-rear direction, and one side (the vehicle forward side) in the front-rear direction is defined as the front side.

As illustrated in FIG. 5, the intake manifold 9 includes the collector 40 including synthetic resin, and a plurality of the branch pipes 9*a* and 9*b* (see FIG. 9 for the branch pipes 9*b*) led out to the front side from the collector 40, the intake outlet 9*d* at the front end of each of the branch pipes 9*a* and 9*b* is supported by the cylinder head 6, and the collector 40 is supported by the fixing structure 2.

As illustrated in FIG. 5, the throttle body 12 is attached to a left or right end of the collector 40 including synthetic resin, the left or right end being opposite to a side supported by the fixing structure 2.

As illustrated in FIG. 5, in the support structure for the intake manifold 9, since the throttle body 12 is attached to the left or right end of the collector 40, the engine front-rear length dimension L is kept short as illustrated in FIG. 3.

As illustrated in FIG. 5, the collector 40 is supported by the fixing structure 2, and the intake manifold 9 is supported at the both front and rear sides. Therefore, a burden of supporting the front side of the intake manifold 9 is reduced.

As illustrated in FIG. 5, since the collector 40 separated rearward from the cylinder head 6 includes lightweight synthetic resin, a rotational moment caused by vertical movement of the collector 40 is reduced, and in this respect, the burden of supporting the front side of the intake manifold 9 is also reduced.

Since the throttle body 12 having a relatively large weight and usually disposed on the rear side of the collector 40 is attached to the left or right side of the collector 40, the rotational moment caused by the vertical movement of the throttle body 12 is reduced as compared with the case where the throttle body is attached to the rear side of the collector 40. In this respect, the burden of supporting the front side of the intake manifold 9 is also reduced.

Figure 7A:
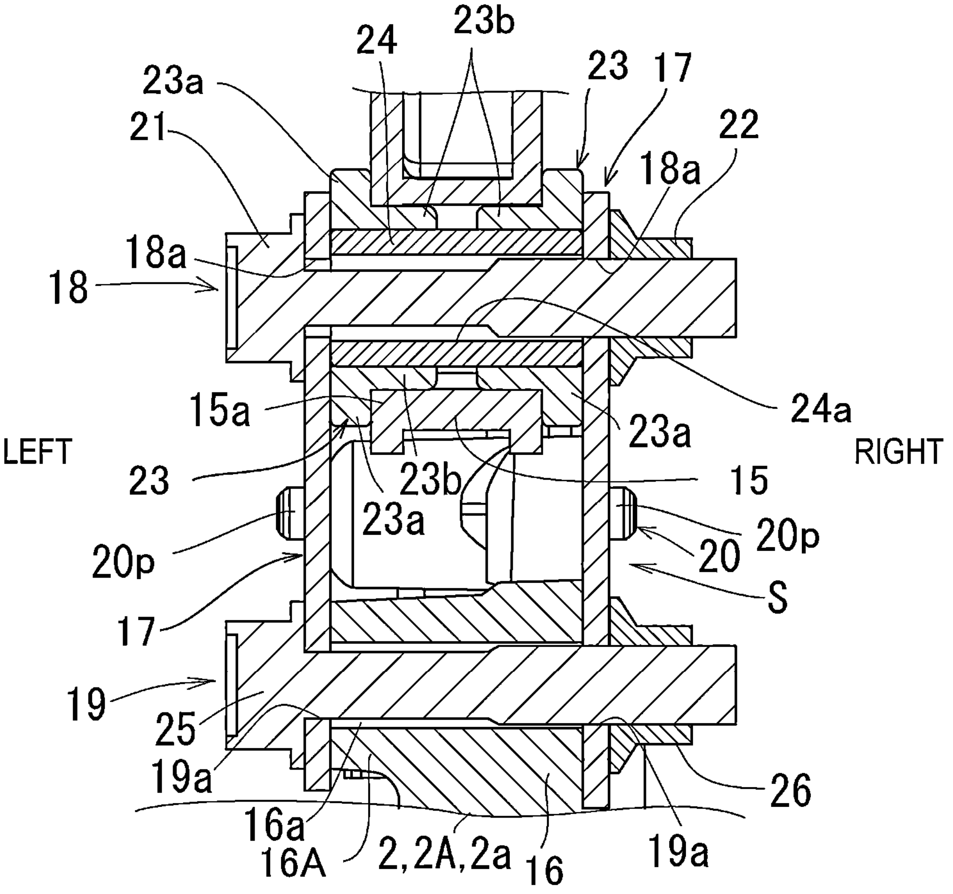
FIGS. 7A and 7B are diagrams illustrating a lower support structure of the intake manifold in FIG. 5.
Figure 7B:
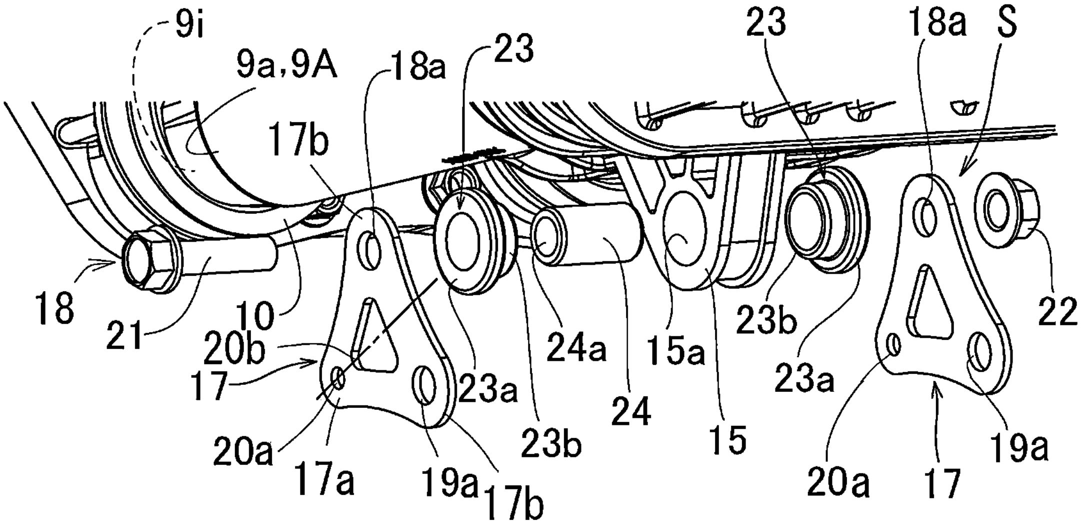

In the support structure for the intake manifold 9, in addition to the above support structure, as illustrated in FIG. 7B, the collector 40 is elastically supported by the fixing structure 2 via a pair of coupling plates 17 and 17 having an identical isosceles triangle shape.

In addition to a geometric isosceles triangle in which the three vertices are edges, the isosceles triangle of the present invention includes a shape similar to a geometric isosceles triangle whose three vertices have an arc shape or another shape and two included angles sandwiched between two sides are equal (hereinafter, referred to as a "similar isosceles triangle").

As illustrated in FIG. 5, the collector 40 is elastically supported by the fixing structure via the pair of coupling plates 17 and 17, and the intake manifold 9 is supported at the both front and rear sides. Therefore, the burden of supporting the front side of the intake manifold 9 is reduced.

Since the collector 40 is elastically supported by the fixing structure 2, the vertical vibration between the collector 40 and the throttle body 12 having a relatively large weight is reduced, and the burden of supporting the front side of the intake manifold 9 is reduced.

As illustrated in FIG. 5, in the support structure for the intake manifold 9, the throttle body 12 is supported by a fixing structure 12B via an intake pipe 14, and a flexible pipe 14A having elasticity is used for the intake pipe 14.

Although the body frame of a vehicle is used as the fixing structure 12B, the fixing structure 12B may be a device mounted on the vehicle.

As illustrated in FIG. 5, in the support structure for the intake manifold 9, since the rear side of the intake manifold 9 is elastically supported via the flexible pipe 14A, the vertical vibration of the throttle body 12 is reduced, and the burden of supporting the front side of the intake manifold 9 is further reduced.

As illustrated in FIG. 3, in the support structure for the intake manifold 9, the fixing structure 2 is disposed below the intake manifold 9, the collector 40 includes a supported portion 15 at a lower portion of the collector 40, the fixing structure 2 includes a supporting portion 16 protruding upward from an upper side of the fixing structure 2, and the supported portion 15 of the collector 40 is supported by the supporting portion 16 of the fixing structure 2.

As illustrated in FIG. 3, in the support structure for the intake manifold 9, a space under the intake manifold 9 is effectively used as a space in which the fixing structure 2 is disposed.

Figure 8A:
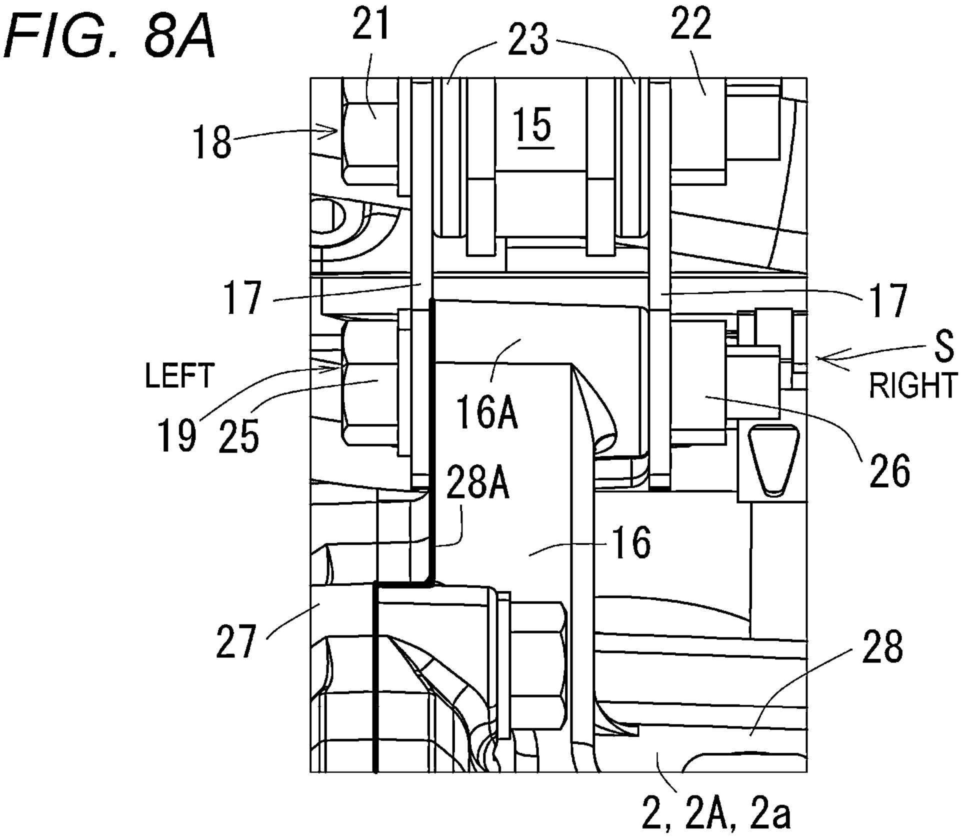
FIGS. 8A and 8B are diagrams for describing the lower support structure of FIG. 5.

As illustrated in FIG. 8A, in the support structure for the intake manifold 9, the fixing structure 2 includes a divided mating surface 28A of the housing 2*a*, and the supporting portion 16 of the fixing structure 2 protrudes from the housing 2*a* along the divided mating surface 28A.

In the support structure for the intake manifold 9 illustrated in FIG. 8A, the supporting portion 16 can be formed at the same time when the housing 2*a* is molded by a mold.

The fixing structure 2 is a transmission 2A, the housing 2*a* of the transmission 2A is divided into a left housing portion 27 and a right housing portion 28 and is joined by the divided mating surface 28A, and the supporting portion 16 is formed in the right housing portion 28.

As illustrated in FIG. 8A, in the support structure for the intake manifold 9, the fixing structure 2 includes the supporting portion 16, and the supporting portion 16 and the supported portion 15 of the collector 40 are coupled via an elastic coupling body S.

Figure 8B:
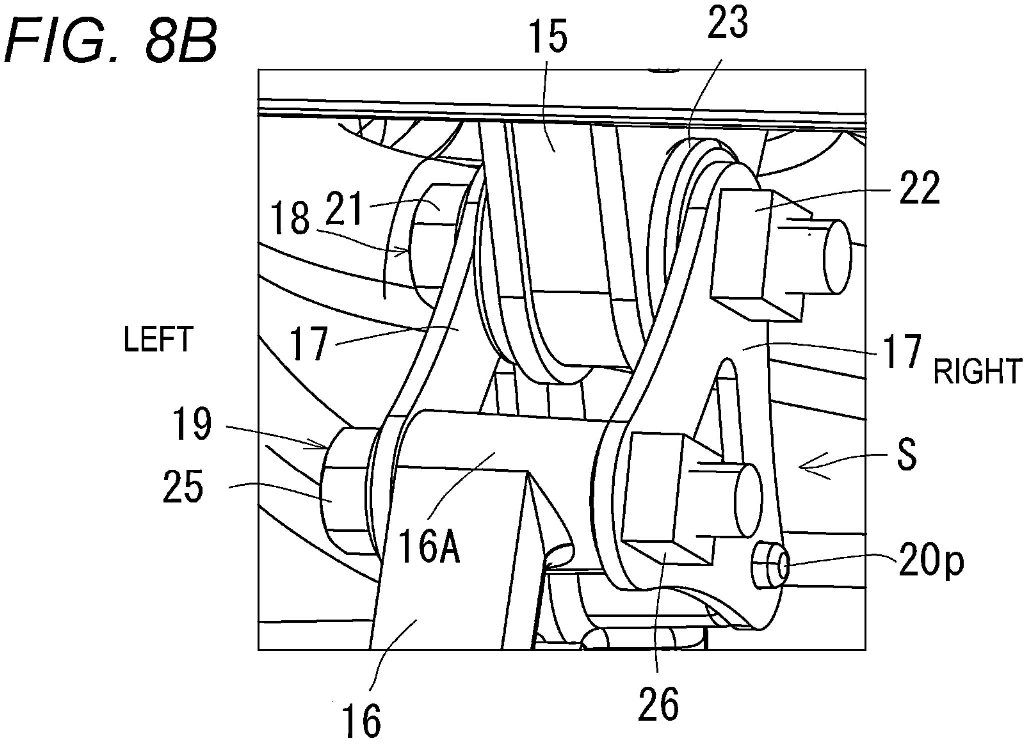

As illustrated in FIG. 8B, in the support structure for the intake manifold 9, the supporting portion 16 and the supported portion 15 are shortened due to the intervention of the elastic coupling body S as compared with a case where the supported portion 15 is directly coupled to the supporting portion 16. Therefore, the rigidity of the supporting portion and the supported portion is enhanced, and durability of the supporting portion 16 and the supported portion 15 is improved.

As illustrated in FIG. 7A, in the support structure for the intake manifold 9, the elastic coupling body S includes the pair of coupling plates 17 and 17 that sandwiches the supporting portion 16 and the supported portion 15 from both sides, a pair of fasteners 18 and 19 that attaches the pair of coupling plates 17 and 17 to the supporting portion 16 and the supported portion 15, and a knock pin 20 that is attached to either the supporting portion 16 or the supported portion 15. The knock pin 20 is inserted into the pair of coupling plates 17 and 17, elastic collars 23 and 23 are attached to at least one fastener 18 of the pair of fastener 18 or 19, and the supported portion 15 of the collector 40 is elastically supported by the supporting portion 16 of the fixing structure 2 via the pair of fasteners 18 and 19 and the elastic collars 23 and 23 positioned by the knock pin 20.

The support structure for the intake manifold 9 allows the fixing structure 2 to elastically support the intake manifold 9 with the elastic coupling body S having a simple structure.

As illustrated in FIG. 7B, in the support structure for the intake manifold 9, the pair of coupling plates 17 and 17 includes a knock pin insertion hole 20*a* through which the knock pin 20 is inserted and fastener insertion holes 18*a* and 19*a* through which the pair of fasteners 18 and 19 (see FIG. 7A for the fastener 18) is inserted, and a pair of the fastener insertion holes 18*a* and 19*a* is arranged at a line-symmetric position in a line-symmetric shape with respect to a virtual symmetric axis 20*b* radially crossing the knock pin insertion hole 20*a*.

The pair of coupling plates 17 and 17 is a similar isosceles triangle whose three vertices are arc-shaped, and includes a metal plate.

As illustrated in FIG. 7B, in the support structure for the intake manifold 9, the coupling plates 17 and 17 have the same assembling shape in both front and reverse faces, and the knock pin insertion holes 20*a* and the pair of fastener insertion holes 18*a* and 19*a* have the same relative positions. Therefore, it is not necessary to check the front and reverse faces of the coupling plates 17 and 17, and the attachment work of the coupling plates 17 and 17 is facilitated.

As illustrated in FIG. 7B, the knock pin insertion hole 20*a* is provided at a top corner 17*a* of each of the coupling plates 17 and 17, and the pair of fastener insertion holes 18*a* and 19*a* are provided at a pair of bottom corners 17*b* and 17*b* having different angles from the top corner 17*a*.

As illustrated in FIG. 7B, in the support structure for the intake manifold 9, during the attachment work of the coupling plates 17 and 17, the top corner 17*a* provided with the knock pin insertion hole 20*a* and the bottom corner 17*b* and 17*b* provided with the fastener insertion holes 18*a* and 19*a* can be identified only by confirming a difference in angle of the corners, and an attachment orientation of the coupling plates 17 and 17 can be confirmed. Therefore, the attachment work of the coupling plates 17 and 17 is further facilitated.

As illustrated in FIG. 7A, a boss portion 16A of the supporting portion 16 sandwiched between the left and right coupling plates 17 and 17 and the coupling plates 17 and 17 are rigidly fastened and fixed by a boss hole 16*a* formed in the boss portion 16A and a first bolt 25 and a first nut 26 constituting a first fastener 19 inserted into the fastener insertion holes 19*a* and 19*a* of the coupling plates 17 and 17. The orientation of each of the coupling plates 17 and 17 around the first bolt 25 is determined by fitting both ends 20*p* and 20*p* of the knock pin 20 protruding from the supporting portion 16 to the left and right with the knock pin insertion holes 20*a* and 20*a* of the coupling plates 17 and 17 illustrated in FIG. 7B.

As illustrated in FIG. 7A, the elastic collars 23 and 23 including a flexible material such as rubber are fitted into the through hole 15*a* of the supported portion 15 on both left and right sides, and a metal spacer 24 is fitted into the boss portions 23*b* and 23*b* of the elastic collars 23 and 23. Then, in a state where the spacer 24 is sandwiched between the left and right coupling plates 17 and 17, fastening and fixing are achieved by the second bolt 21 and the second nut 22 constituting a second fastener 18 passing through the fastener insertion holes 18*a* and 18*a* of the coupling plates 17 and 17 and an inner hole 24*a* of the spacer 24.

As illustrated in FIG. 7A, the elastic collar 23 has an L-shaped cross section including the cylindrical boss portion 23*b* and a disk-shaped flange 23*a*, and in an assembled state where the elastic collar 23 is fastened by the second bolt 21 and the second nut 22, the left and right flanges 23*a* and 23*a* are slightly compressed left and right. As a result, the intake manifold 9 is elastically supported by a housing 2Aa of the transmission 2A. The coupling plates 17 and 17 rigidly fixed to the supported portion 15 may be attached to the supporting portion 16 in an elastically supported state.

Next, an internal structure of the collector 40 of the intake manifold 9 will be described.

As illustrated in FIG. 9, the intake manifold 9 includes the collector 40 and the plurality of branch pipes 9*a* and 9*b* led out from the collector 40.

Assuming that a longitudinal direction of the collector 40 is the left-right direction, a throttle communication port 41 is opened on the left or right end of the collector 40.

The branch pipes 9*a* and 9*b* include tank-side openings 9*aa* and 9*ba* facing an internal space 40S of the collector 40.

As illustrated in FIG. 9, the collector 40 includes a boundary wall 45 at a boundary between the throttle communication port 41 and the tank-side opening 9*ba* of the branch pipe 9*b* close to the throttle communication port 41, and the boundary wall 45 includes an inward protrusion 45*a* protruding toward the internal space 40S of the collector 40.

As illustrated in FIG. 5, in the collector 40, the throttle communication port 41 is opened on the left or right end of the collector 40, and the throttle body 12 is connected to the throttle communication port 41. Therefore, as illustrated in FIG. 3, the engine front-rear length dimension L is kept short.

In the internal structure of the collector 40, an intake amount of each cylinder is equalized. The reason is estimated as follows.

An intake resistance of the inward protrusion 45*a* illustrated in FIG. 9 hinders intake air supply to a cylinder close to the throttle communication port 41 whose intake amount is likely to increase, and intake air that has not been used for supply to the cylinder is supplied to a distant cylinder whose intake amount is likely to decrease, so that the intake amount of each cylinder is equalized.

As illustrated in FIG. 9, in the internal structure of the collector 40, an inner surface of the inward protrusion 45*a* is formed by an arc surface 45*aa* having an inward protruding shape.

In the internal structure of the collector 40, the inward protruding arc surface 45*aa* illustrated in FIG. 9 makes it difficult for a turbulence to occur in the intake air, and the intake air supply to each cylinder is hardly hindered by the turbulence.

Next, the outer wall structure of the collector 40 will be described.

As illustrated in FIG. 9, in the outer wall structure of the collector 40, among left and right end walls of the collector 40, a non-throttle side end wall 40*e* on the opposite side to the end wall provided with the throttle communication port 41 protrudes to a non-throttle side from an internal passage 9*ac* of the branch pipe 9*a* on the non-throttle side.

In the outer wall structure of the collector 40, the internal space 40S of the collector 40 is expanded to the non-throttle side with respect to the internal passage 9*ac* of the branch pipe 9*a* on the non-throttle side at the non-throttle side end wall 40*e* illustrated in FIG. 9, the air intake of the cylinders far from the throttle communication port 41 is promoted, and the intake amount of each cylinder approaches an equal amount.

As illustrated in FIG. 9, in the outer wall structure of the collector 40, a non-cylinder head side end wall 40*c* of the collector 40 protrudes to a non-cylinder head side from the throttle communication port 41.

In the outer wall structure of the collector 40, in the non-cylinder head side end wall 40*c* illustrated in FIG. 9, the internal space 40S of the collector 40 is expanded to the non-cylinder head side with respect to the throttle communication port 41, the air intake to the cylinders far from the throttle communication port 41 is promoted, and the intake amount of each cylinder approaches an equal amount.

Figure 10:
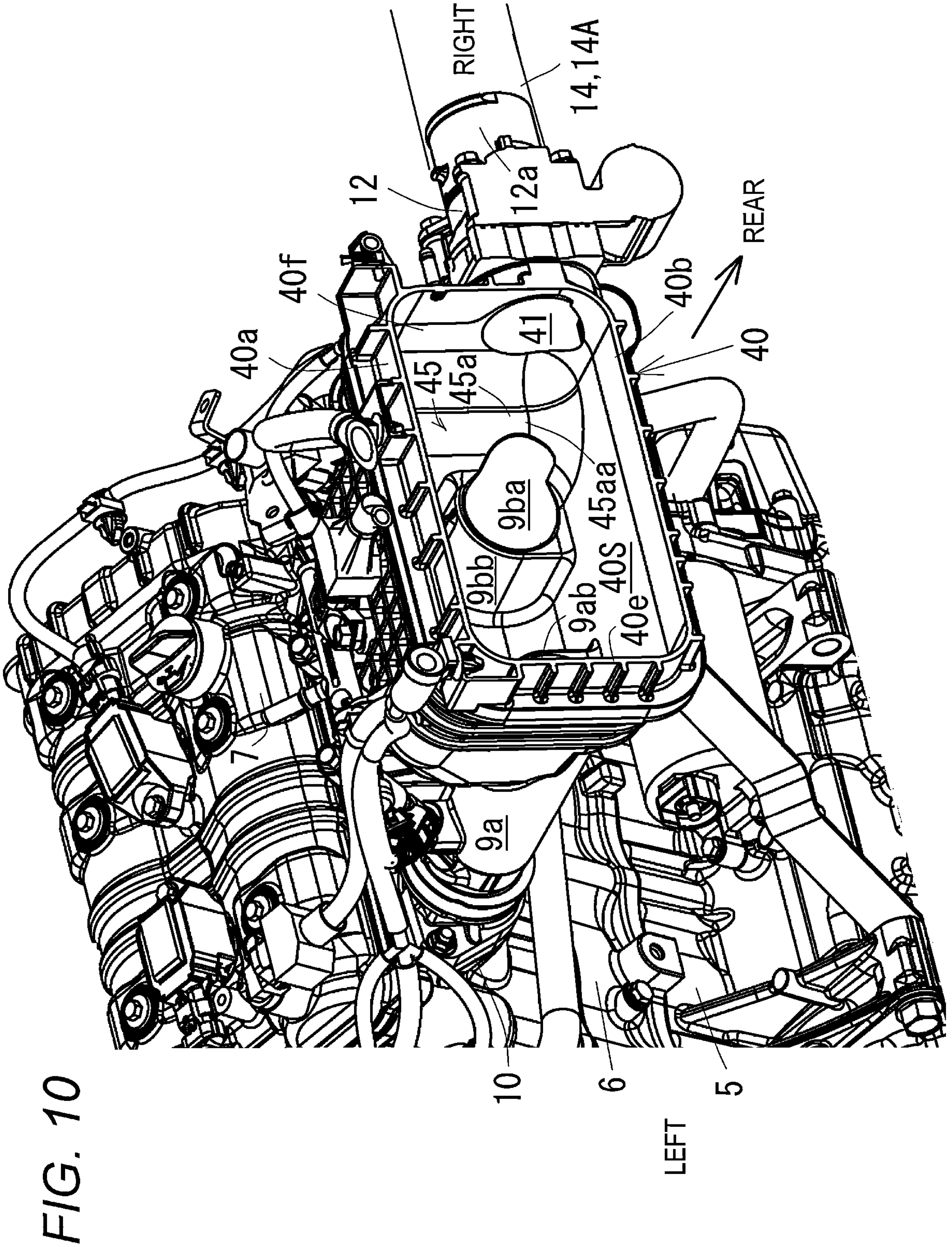
FIG. 10 is a perspective view illustrating a longitudinal rear surface of the intake manifold in FIG. 9.

In FIG. 10, a reference sign 40*a* denotes a ceiling wall of the collector 40, and a reference sign 40*b* denotes a bottom wall.

Next, the engine model using the intake manifold will be described.

As illustrated in FIG. 9, the intake manifold 9 is an intake manifold in which the pair of left and right branch pipes 9*a* and 9*b* is led out from the collector 40, and is used for a two-cylinder engine.

When the intake manifold 9 is used for a two-cylinder engine having a large difference in intake path from the throttle communication port 41, the effect of equalizing the intake amount of each cylinder becomes apparent.

The pair of branch pipes 9*a* and 9*b* (see FIG. 9 for the branch pipe 9*b*) illustrated in FIG. 5 extends straight and parallel from the collector 40 toward the cylinder head 6. As shown in FIG. 9, peripheral walls 9*ab* and 9*bb* of the tank-side openings 9*aa* and 9*ba* of the pair of branch pipes 9*a* and 9*b* each protrude from a cylinder head side end wall 40*d* of the collector 40 toward the internal space 40S of the collector 40.

The intake manifold 9 is used in a four-cycle inline two-cylinder engine in which a crank pin angle of the crankshaft 1A illustrated in FIG. 4 is 180°, and a phase difference between an intake stroke of a second cylinder on the side of the throttle communication port 41 illustrated in FIG. 9 and an intake stroke of a first cylinder performed following the intake stroke is 180° in crank angle.

When the first cylinder is used in this engine model, an intake shortage is likely to occur in the first cylinder in which the intake stroke is started with a relatively small phase difference of 180° after the start of the intake stroke of the second cylinder. When this intake manifold is used in the engine, the effect of equalizing the intake amount of each cylinder becomes more apparent.

Next, the oil inspector for the engine will be described.

Figure 11:
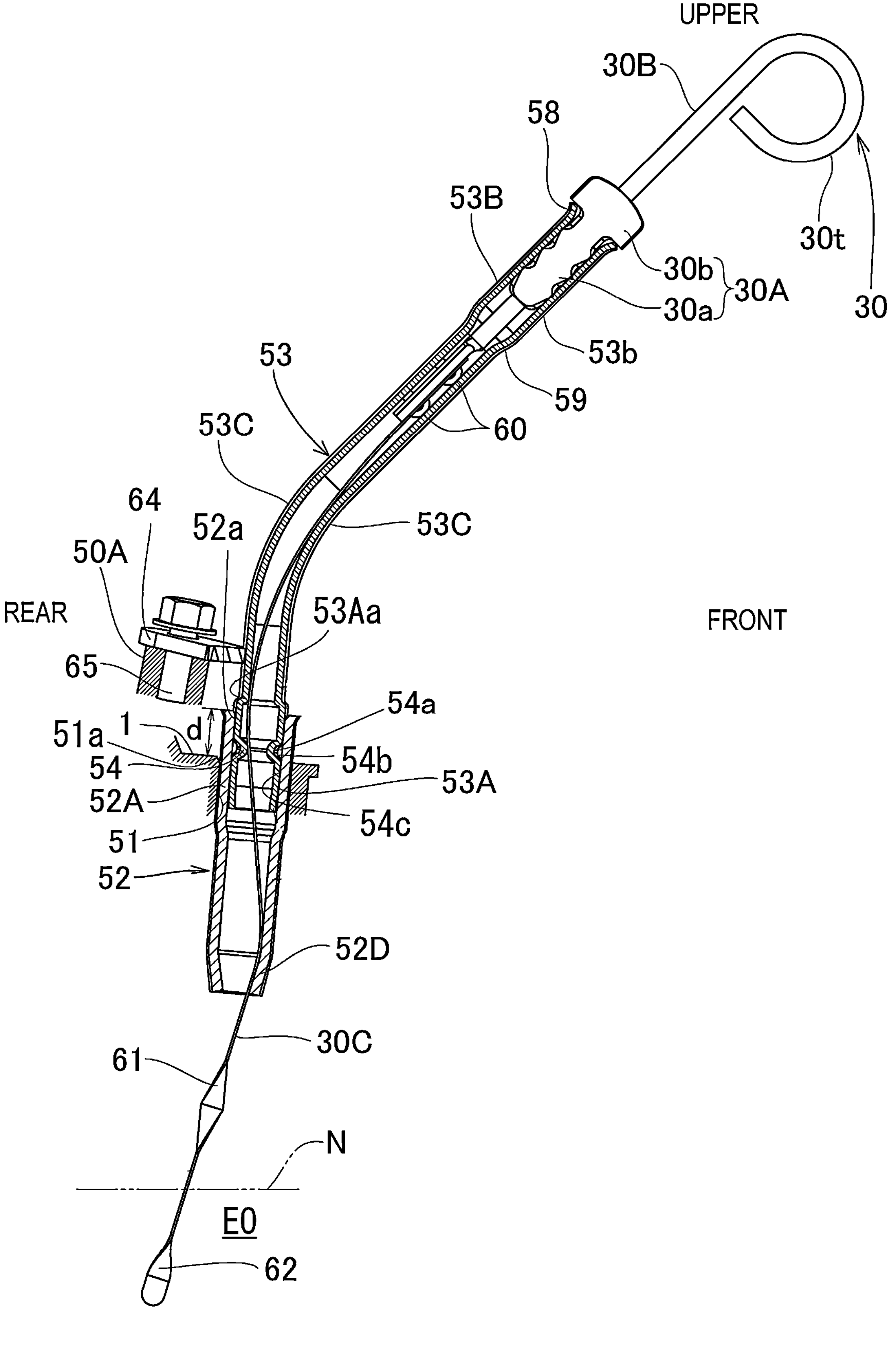
FIG. 11 is a longitudinal sectional side view of an oil inspector used for the engine mounted on the multipurpose four-wheeled vehicle in FIG. 1.

The engine 2 illustrated in FIG. 2A includes the oil inspector, and as illustrated in FIG. 11, the oil inspector includes the oil gauge 30, a guide pipe 53 that guides the oil gauge 30 to an engine oil EO in the oil pan 8, and a support pipe 52 that supports the guide pipe 53 in the crankcase 1.

The support pipe 52 is inserted into a support pipe insertion hole 51 of the crankcase 1.

An inner fitting portion 53A is provided at a lower end of the guide pipe 53, the inner fitting portion 53A is internally fitted and fixed to an upper end of the support pipe 52, a ridge 54 is circumferentially provided on an inner periphery of the inner fitting portion 53A, and a curved portion 53*c* is provided at an intermediate portion of the guide pipe 53.

As illustrated in FIG. 11, an upper side of the guide pipe 53 is inclined upward in a direction away from the crankcase 1 due to the curved portion 53*c*, and the oil gauge 30 inserted into the guide pipe 53 is configured to be in contact with inner peripheral surfaces of the curved portion 53*c*, the ridge 54, and the support pipe 52.

The oil inspector of the engine is suitable when there is an access path to the oil inspector only obliquely above the guide pipe 53 due to an engine mounting environment, the oil inspector is accessible from obliquely above the guide pipe 53, and the oil gauge 30 can be inserted and removed along an obliquely upward direction of the guide pipe 53.

As illustrated in FIG. 11, in the oil inspector of the engine, the oil gauge 30 inserted into the guide pipe 53 comes into contact with three points of the inner peripheral surfaces of the curved portion 53*c*, the ridge 54, and the support pipe 52. Therefore, resistance in a pulling direction of the oil gauge 30 is large, and it is possible to prevent the oil gauge 30 from being pulled out of the guide pipe 53 by inertia force at the time of braking of the vehicle equipped with the engine.

As illustrated in FIG. 11, the oil inspector of the engine includes a tapered portion 52D whose inner diameter gradually decreases downward at a lower end of the support pipe 52.

As illustrated in FIG. 11, in the oil inspector of the engine, the oil gauge 30 penetrating the support pipe 52 is received inside the tapered portion 52D at the lower end of the support pipe 52, and swinging of the oil gauge 30 protruding from the support pipe 52 toward the oil pan 8 is suppressed.

As illustrated in FIG. 11, in the oil inspector for the engine, the inner fitting portion 53A of the guide pipe 53 is enlarged in diameter, and the oil gauge 30 inserted into the guide pipe 53 is also configured to come into contact with a non-enlarged diameter portion 53Aa of the guide pipe 53 adjacent to the enlarged inner fitting portion 53A on the upper side of the inner fitting portion 53A.

As illustrated in FIG. 11, in the oil inspector of the engine, since the oil gauge 30 also comes into contact with the non-enlarged diameter portion 53Aa of the guide pipe 53 adjacent to the inner fitting portion 53A, the resistance of the oil gauge 30 in the pulling direction further increases.

As illustrated in FIG. 11, in the oil inspector of the engine, a recessed groove 54*a* is circumferentially provided on an outer periphery of the ridge 54, an O-ring 54*b* is internally fitted in the recessed groove 54*a*, and an inter-pipe gap 54*c* between the inner fitting portion 53A of the guide pipe 53 and the support pipe 52 is sealed by the O-ring 54*b*.

The oil inspector of the engine enhances sealability of the inter-pipe gap 54*c*.

As illustrated in FIG. 11, in the oil inspector of the engine, an upper end 52*a* of the support pipe 52 is separated upward from an upper edge 51*a* of the support pipe insertion hole 51 of the crankcase 1 by a distance d.

As illustrated in FIG. 11, in the oil inspector of the engine, since foreign matter such as dust accumulated around the support pipe insertion hole 51 does not enter the inter-pipe gap 54*c* from the upper end 52*a* of the support pipe 52 separated upward by the distance d, damage of the O-ring 54*b* due to engagement of the foreign matter is prevented.

As illustrated in FIG. 11, the guide pipe 53 including a metal material or the like includes the inner fitting portion 53A internally fitted to an enlarged diameter portion 52A of the support pipe 52, an upper end (proximal end) 53B into which a plug 30A including an elastic material and fitted to an upper end of the oil gauge 30 is internally fitted, and an intermediate portion 53C between the inner fitting portion 53A and the upper end 53B. The curved portion 53*c* in which an intermediate portion in a longitudinal direction is bent at an angle x (for example, from 35 degrees to 45 degrees) is formed in the intermediate portion 53C which is the diameter of an original pipe member.

As illustrated in FIG. 11, the upper end 53B has an enlarged diameter opening 53*b* that is a point where the plug 30A is tightly fitted by enlarging the diameter of the original pipe material. The enlarged diameter opening 53*b* has an upper side (proximal end) formed as a dilated opening 58 and a lower side (distal end) formed as a diameter changing portion 59 in which the diameter gradually increases from the original diameter toward the enlarged diameter opening 53*b*. The diameter of the enlarged diameter opening 53*b* is set to such a diameter that the plug 30A pushed into the inner peripheral surface by the operation of a finger does not easily come out.

As illustrated in FIG. 11, the oil gauge 30 includes a grip 30B in an upper portion (proximal end) including a metal bar material, a gauge 30C coupled and integrated with a lower portion of the grip 30B by a rivet 60, and the plug 30A fitted to the grip 30B. The plug 30A includes a stepped cylindrical portion 30*a* that is lightly press-fitted into the enlarged diameter opening 53*b*, and a large-diameter stop portion 30*b* that is received by the dilated opening 58. The upper end of the grip 30B is substantially rounded at 270 degrees to form a hook 30*t* through which a finger can pass.

As illustrated in FIG. 11, the gauge 30C includes a flexible material (for example, spring steel) having a thin long plate shape with a flat cross section, and is provided with first and second twisted portions 61 and 62 twisted at 180 degrees at a lower end and at 90 degrees at a lower end, respectively.

A line N illustrated in FIG. 11 is an upper limit of the engine oil EO accumulated in the oil pan 8 and a lower portion of the crankcase 1.

As illustrated in FIG. 11, a bracket 64 including a metal plate is attached to a position between the inner fitting portion 53A and the curved portion 53*c* of the guide pipe 53 by welding or the like. The bracket 64 can be fastened and fixed to an attachment boss 50A formed in the crankcase 1 by a bolt 65 through a hole (not illustrated) formed in the bracket 64. The attachment boss 50A is a boss portion for mounting an oil gauge in a crankcase of an engine before improvement, and is effectively used as a boss for screwing a bolt 65 in the engine.

Figure 12:
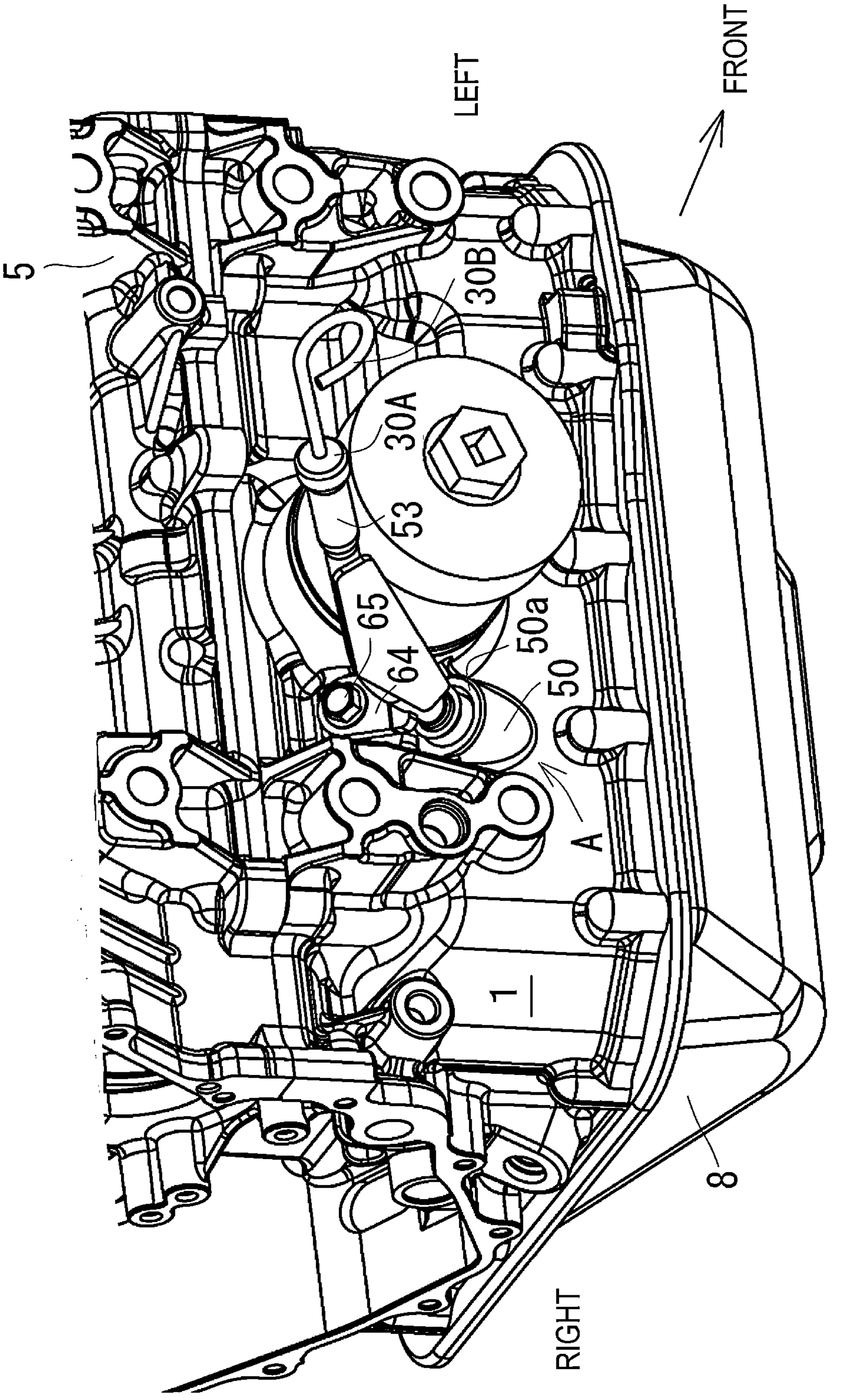
FIG. 12 is a perspective view of the oil inspector in FIG. 11 and a periphery of the oil inspector.
Figure 13:
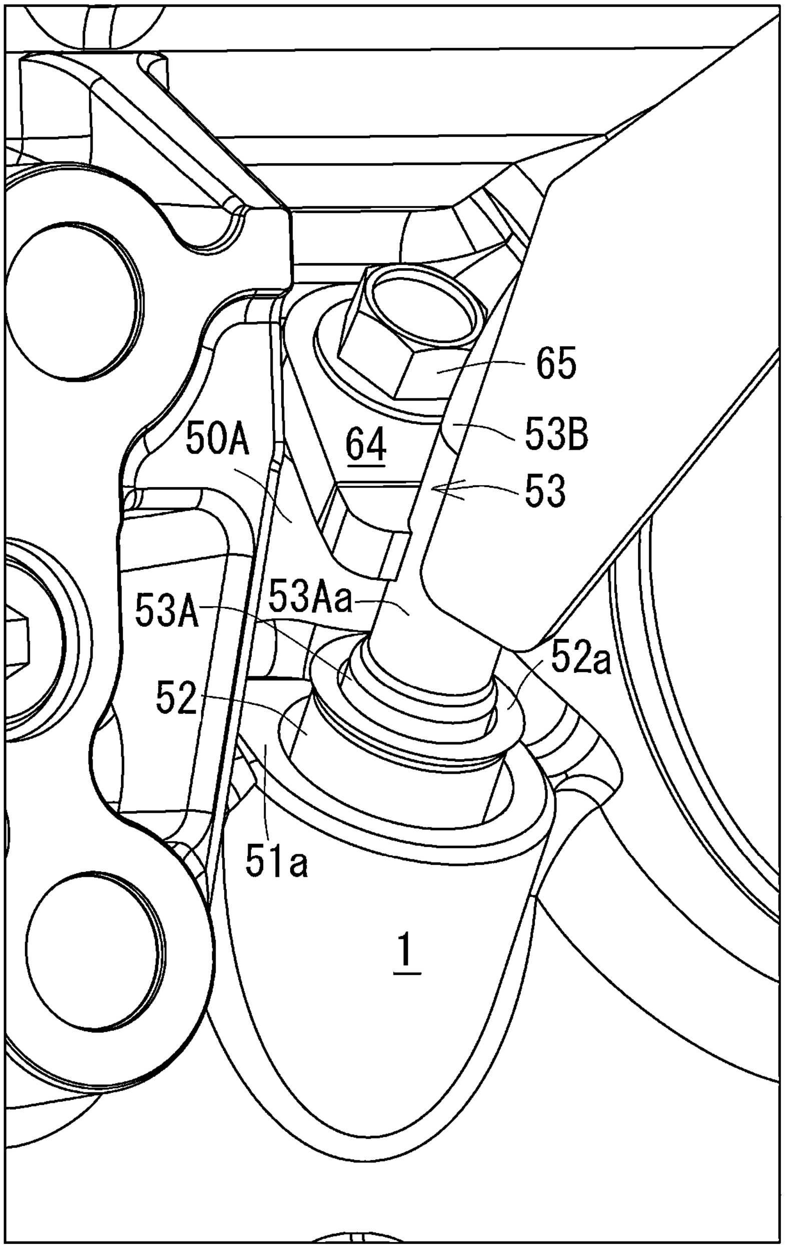
FIG. 13 is an enlarged perspective view of the oil inspector in FIG. 12.

FIG. 12 is a perspective view of the oil inspector of FIG. 11 and a periphery of the oil inspector, and FIG. 13 is an enlarged perspective view of the oil inspector of FIG. 12.

In the multipurpose four-wheeled vehicle V illustrated in FIG. 1, as illustrated in FIG. 2A, the engine E is disposed behind the seat 34A and below the front portion of the cargo bed 35, the oil inspector is disposed on the front side of the crankcase 1, and the upper portion of the guide pipe 53 obliquely extends forward and upward.

As illustrated in FIG. 3, the grip 30B at the upper end of the oil gauge 30 is located behind the back plate 38*b* which is a support member of the seat 34A (see FIGS. 2A and 2B), the back plate 38*b* is provided with an openable (or detachable) lid body 66, the lid body 66 is opened (or removed), the oil gauge 30 is inserted and removed along an obliquely forward upper direction of the guide pipe 53 by accessing the oil inspector from obliquely forward and above of the guide pipe 53, and the inspection work of an engine oil amount can be performed. In FIG. 3, a reference sign 67 denotes an oil filter.

What is claimed is:

1. A support structure for an intake manifold, the support structure comprising: a cylinder head; and a fixing structure, the support structure supporting the intake manifold, wherein an axial length direction of a crankshaft center is defined as a left-right direction, a horizontal direction orthogonal to the left-right direction is defined as a front-rear direction, one side in the front-rear direction is defined as a front side, the intake manifold includes a collector including a synthetic resin, the intake manifold including a plurality of branch pipes led out to the front side from the collector, an intake outlet at a front end of each of the branch pipes is supported by the cylinder head, the collector is elastically supported by the fixing structure via a pair of coupling plates having an identical isosceles triangle shape, a throttle body is attached to a left or right end of the collector, the left or right end being opposite to a side supported by the fixing structure, the fixing structure is disposed below the intake manifold, the collector includes a supported portion at a lower portion of the collector, the fixing structure includes a supporting portion protruding upward from an upper side of the fixing structure, the supported portion of the collector is supported by the supporting portion of the fixing structure, the supporting portion and the supported portion of the collector are coupled via an elastic coupling body, the elastic coupling body includes a pair of coupling plates that sandwiches the supporting portion and the supported portion from both sides, a pair of fasteners that attaches the pair of coupling plates to the supporting portion and the supported portion, and a knock pin that is attached to either the supporting portion or the supported portion, the knock pin is inserted into the pair of coupling plates, an elastic collar is attached to at least one fastener of the pair of fasteners, and the supported portion of the collector is elastically supported by the supporting portion of the fixing structure via the pair of fasteners and the elastic collar positioned by the knock pin.

2. The support structure for the intake manifold according to claim 1, wherein the throttle body is supported by the fixing structure via an intake pipe, and a flexible pipe having elasticity is used for the intake pipe.

3. The support structure for the intake manifold according to claim 2, wherein the pair of coupling plates includes a knock pin insertion hole through which the knock pin is inserted and a fastener insertion hole through which the pair of fasteners is inserted, and a pair of the fastener insertion holes is arranged at a line-symmetric position in a line-symmetric shape with respect to a virtual symmetric axis radially crossing the knock pin insertion hole.

4. The support structure for the intake manifold according to claim 3, wherein the knock pin insertion hole is provided at a top corner of each of the coupling plates, and the pair of fastener insertion holes is provided at a pair of bottom corners having different angles from the top corner.

5. The support structure for the intake manifold according to claim 1, wherein the fixing structure includes a divided mating surface of a housing, and the supporting portion of the fixing structure protrudes from the housing along the divided mating surface.

6. The support structure for the intake manifold according to claim 5, wherein the pair of coupling plates includes a knock pin insertion hole through which the knock pin is inserted and a fastener insertion hole through which the pair of fasteners is inserted, and a pair of the fastener insertion holes is arranged at a line-symmetric position in a line-symmetric shape with respect to a virtual symmetric axis radially crossing the knock pin insertion hole.

7. The support structure for the intake manifold according to claim 6, wherein the knock pin insertion hole is provided at a top corner of each of the coupling plates, and the pair of fastener insertion holes is provided at a pair of bottom corners having different angles from the top corner.

8. The support structure for the intake manifold according to claim 5, wherein the throttle body is supported by the fixing structure via an intake pipe, and a flexible pipe having elasticity is used for the intake pipe.

9. The support structure for the intake manifold according to claim 8, wherein the pair of coupling plates includes a knock pin insertion hole through which the knock pin is inserted and a fastener insertion hole through which the pair of fasteners is inserted, and a pair of the fastener insertion holes is arranged at a line-symmetric position in a line-symmetric shape with respect to a virtual symmetric axis radially crossing the knock pin insertion hole.

10. The support structure for the intake manifold according to claim 9, wherein the knock pin insertion hole is provided at a top corner of each of the coupling plates, and the pair of fastener insertion holes is provided at a pair of bottom corners having different angles from the top corner.

11. The support structure for the intake manifold according to claim 1, wherein the pair of coupling plates includes a knock pin insertion hole through which the knock pin is inserted and a fastener insertion hole through which the pair of fasteners is inserted, and a pair of the fastener insertion holes is arranged at a line-symmetric position in a line-symmetric shape with respect to a virtual symmetric axis radially crossing the knock pin insertion hole.

12. The support structure for the intake manifold according to claim 11, wherein the knock pin insertion hole is provided at a top corner of each of the coupling plates, and the pair of fastener insertion holes is provided at a pair of bottom corners having different angles from the top corner.

* * * * *